(12) United States Patent
Mohr et al.

(10) Patent No.: US 6,176,702 B1
(45) Date of Patent: Jan. 23, 2001

(54) SIMPLE REMOTELY TUNED SOLID CORE FUEL JET, LOW $NO_X$ FUEL GAS BURNER

(75) Inventors: Patrick J. Mohr, Mims; David S. Neff, Longwood; Joseph G. Gaddone, Oviedo; Jack L. Nitzman, Altamonte Springs, all of FL (US)

(73) Assignee: Combustion Tec, Apopka, FL (US)

( * ) Notice: Under 35 U.S.C. 154(b), the term of this patent shall be extended for 0 days.

(21) Appl. No.: 09/287,455

(22) Filed: Apr. 7, 1999

(51) Int. Cl.⁷ .................................................. F23C 5/06
(52) U.S. Cl. .......................................... 431/186; 239/587.1
(58) Field of Search ..................................... 431/187, 186, 431/8, 354, 158; 239/587.1, 456, 591, 590, 590.3, 590.5; 266/904, 48

(56) References Cited

U.S. PATENT DOCUMENTS

| | | | |
|---|---|---|---|
| 346,611 | * 8/1886 | Root ...................................... | 431/354 |
| 368,266 | * 8/1887 | Wright .................................. | 239/400 |
| 1,289,042 | * 12/1918 | Campbell ............................ | 431/354 |
| 1,870,013 | * 8/1932 | Keenan, Jr. ......................... | 431/187 |
| 1,904,469 | * 4/1933 | Keller .................................. | 431/186 |
| 2,242,787 | * 5/1941 | Lieberherr ........................... | 431/187 |
| 2,368,178 | * 1/1945 | Turpin ................................. | 431/187 |
| 2,672,190 | * 3/1954 | Schumann ........................... | 431/187 |
| 3,266,552 | * 8/1966 | Denis ................................... | 431/186 |
| 3,556,702 | * 1/1971 | Kinney et al. ...................... | 431/187 |
| 3,685,740 | * 8/1972 | Shepherd ............................. | 431/186 |
| 4,813,867 | * 3/1989 | Yoshida et al. ..................... | 431/186 |
| 4,976,607 | * 12/1990 | Grimard .............................. | 431/187 |
| 5,139,416 | 8/1992 | Wagner et al. . | |
| 5,199,866 | * 4/1993 | Joshi et al. .......................... | 431/187 |
| 5,490,775 | * 2/1996 | Joshi et al. .......................... | 431/187 |
| 5,567,141 | * 10/1996 | Joshi et al. .......................... | 431/187 |
| 5,570,679 | 11/1996 | Wunning . | |
| 5,882,184 | * 3/1999 | Feldermann ........................ | 431/187 |

* cited by examiner

Primary Examiner—Ira S. Lazarus
Assistant Examiner—David Lee
(74) Attorney, Agent, or Firm—Pauley Petersen Kinne & Fejer

(57) ABSTRACT

A remotely controllable gaseous fuel burner having a burner body with a fuel inlet, a fuel outlet, and a constricted throat region immediately upstream of the fuel outlet. A concentrically disposed and longitudinally movable fuel conduit is disposed within the burner body forming an annular region between the burner body and the fuel conduit. The fuel conduit having a conduit fuel outlet forms a conduit fuel inlet in a wall of the fuel conduit. The outer surface of the conduit fuel outlet immediately upstream of the conduit fuel outlet is tapered and has an outside diameter larger than the inside diameter of the constricted throat.

14 Claims, 2 Drawing Sheets

SIMPLE REMOTELY TUNED SOLID CORE FUEL JET, LOW $NO_x$ FUEL GAS BURNER

BACKGROUND OF THE INVENTION

1. Field of the Invention

This invention relates to a fuel gas burner suitable for use in industrial furnaces, such as regenerative glass melting furnaces, which produces a flame comprising a solid core fuel jet and retards the formation of $NO_x$. More particularly, this invention relates to a solid core fuel jet, low $NO_x$ fuel gas burner of a tube-in-a-tube design wherein the inner tube is remotely adjustable for varying fuel gas velocity so as to maintain optimal flame characteristics for flame control, low emissions, and maximum heat transfer.

2. Description of Prior Art

Industrial furnaces, such as regenerative glass melting furnaces, operate at extremely high combustion temperatures, typically in the range of about 2400–3000° F. to promote higher production rates, higher product quality, and higher furnace thermal efficiency. As a result, furnace and flame temperatures tend to be high, resulting in the generation of significant amounts of $NO_x$ emissions. As a result of the 1990 Clean Air Act, many regional municipalities now impose $NO_x$ emission limits on high temperature industrial furnaces.

Recent efforts to address the increasingly stringent emission limits have resulted in the development of a few furnace retrofit $NO_x$ control technologies. The majority of these technologies operate to inhibit $NO_x$ formation by modifying flame stoichiometry and the overall combustion process. Such retrofit $NO_x$ control technologies include oxygen-enriched air staging in which oxygen-enriched air is introduced in stages into the combustion process, gas reburn in which a gaseous fuel is introduced into the flue gases downstream of the primary combustion zone, fuel staging in which the fuel is introduced in stages into the combustion process, oscillating combustion, and pulsed combustion. In oscillating combustion, the flow of fuel is oscillated around a stoichiometric value, thereby producing alternatingly fuel-rich and fuel-lean zones within the flame. Because both fuel-rich and fuel-lean combustion produces less $NO_x$ than stoichiometric combustion, the $NO_x$ formed in each zone is significantly lower than that which would occur if the combustion took place without fuel oscillation but at the same overall stoichiometry.

Pulsed combustion utilizes a cyclic combustion process to produce heat and pressure waves that increase a drying or heating rate. The combustion cycle begins when air and the fuel are ignited inside a combustor to produce a rapid pressure rise. The rise in pressure temporarily shuts off the lower pressure fuel supply. The combustion induced pressure then drops as the combustion products leave the combustion chamber, drawing a fresh air/fuel mixture into the chamber and restarting the cycle. Due in part to the success of the retrofit $NO_x$ control technology and the knowledge of the importance of proper furnace control in reducing emissions, increasing furnace efficiency, and extending furnace life, developments in the areas of improved furnace controls using advanced sensors, temperature mapping techniques, and computer control algorithms to supplement the primary combustion process can be expected. Eventually, a computer control system will couple the improved sensors to the burners and emission control system to enable maximum furnace efficiency, lowest possible emissions, and extended furnace life.

Before a control strategy can be coupled to burners, it is necessary to have a burner which can be remotely tuned. Conventional burners are equipped with either manual velocity adjustment mechanisms local to the burner or have no velocity adjustment capabilities whatsoever. Known burners with velocity adjustment capabilities utilize a tube-in-a-tube design to vary velocity in order to maintain optimal flame characteristics for flame control, low emissions, and maximum heat transfer. In such burners, gas flows through the annular space created by the tube-in-a-tube arrangement. The inner tube is provided with a tapered tip which translates manually through the fuel outlet of the outer tube, thereby varying the area of the fuel outlet of the outer tube and, thus, the gas velocity. However, such annular jets can be less stable than a solid core gas jet and are destroyed relatively quickly upon exit from the burner. Rapid destruction of the annular jet can cause an increase in mixing between the gas and air stream which, in turn, is known to increase $NO_x$ emissions. An industrial burner in which fuel and combustion air are provided through coaxial conduits into a combustion chamber is taught, for example, by U.S. Pat. No. 5,570,679 to Wunning. U.S. Pat. No. 5,139,416 to Wagner et al. teaches a gas burner for use in glass melting furnaces comprising a mixing tube having a perforated mixer for mixing fuel gas with air inspirated with gas flow, means for supplying fuel gas to the mixing tube, and an inspiration tube located in the mixing tube. The perforated mixer is situated inside the mixing tube at the end of the inspiration tube.

A significant complication in the manual adjustment of conventional burners, particularly on a routine basis, is their location on hot, difficult to access combustion ports. As a result, when burners are initially installed, they are tuned by adjustment of the velocities of the fuel gases flowing therethrough to provide optimal performance for the initial firing rate. In the case of glass melting furnaces, an optimal flame provides maximum heat transfer to the glass melt, low emissions, and good flame control so as not to impinge on refractory surfaces. However, when burner fuel flow rates are varied due to load changes, or for reasons of temperature control within the furnace, the burners are typically not readjusted due to inaccessibility or other inconvenience, and optimal flame characteristics are sacrificed. This is particularly true in situations where fuel changes occur frequently. Failing to maintain proper flame control can result in higher emissions, reduced fuel efficiency, and accelerated refractory wear. Similar detrimental results can occur when combustion air flow rates are changed, a requirement for using several known retrofit $NO_x$ control technologies.

SUMMARY OF THE INVENTION

Accordingly, it is one object of this invention to provide a fuel burner which can be remotely tuned, either by a furnace operator or a computerized burner control system, so that optimal flame velocities can be easily or automatically maintained over the complete firing range of the burner.

It is another object of this invention to provide a fuel gas burner which generates lower furnace $NO_x$ emissions than conventional burners through the use of a solid core gas fuel jet which provides for improved flame stability and jet penetration as opposed to annular jet geometries of conventional burners. It is yet another object of this invention to provide a fuel gas burner through which air can be conveyed when it is not conveying fuel, such as in the off-firing cycle of a regenerative furnace, so as to oxidize any CO and unburned hydrocarbons which can result from the firing side burners, as well as to control regenerator temperature, particularly on older furnaces.

It is yet another object of this invention to provide a fuel gas burner utilizing a combination of core and annular gas flows which lowers furnace $NO_x$ emissions, provides better flame control, flame stability and jet penetration into the combustion air stream compared to conventional burners employing annual jet geometries.

These and other objects of this invention are achieved by a gaseous fuel burner comprising a burner body having a fuel inlet and a fuel outlet and a burner body nozzle, having a constricted throat region and a burner body nozzle fuel outlet, connected to the fuel outlet of the burner body. A fuel conduit is concentrically disposed within the burner body. The fuel conduit comprises a conduit fuel outlet and forms a conduit fuel inlet in a wall of the fuel conduit. The fuel conduit is longitudinally movable within the burner body and forms an annular region between the burner body and the fuel conduit. A conduit nozzle is connected to the conduit fuel outlet of the fuel conduit. The outside surface of the conduit nozzle is tapered in a direction of the burner body nozzle fuel outlet of the burner body. As a result, when the fuel conduit within the burner body is longitudinally moved to an extreme forward position, the tapered portion of the conduit nozzle restricts the constricted throat of the burner body nozzle, thereby reducing annular fuel flow and forcing an upper limit of the fuel flowing into the burner body to flow into the fuel conduit and out of the burner through the conduit nozzle. This position of the fuel conduit within the burner body corresponds to the maximum velocity position for any given fuel flow rate. As the fuel conduit is longitudinally retracted from the maximum velocity position, the annular area between the outer surface of the conduit nozzle and the constricted throat region of the burner body nozzle gradually increases, resulting in a reduction in the velocity of the fuel gas exiting the burner. When the burner is not conveying fuel, as in the case of the off-side of a regenerative furnace, the burner body forms a cooling air inlet through which cooling air can be introduced. The air can be supplied from a compressor or any other suitable source. Alternatively, an oxidant can be introduced through the fuel inlet, in which case, a switching valve located near the burner would be used to allow either a gaseous fuel or oxidant to enter the burner body. The oxidant may be used to oxidize any CO and unburned hydrocarbons produced by the firing side burners. On older furnaces, the cooling air conveyed through the gaseous fuel burner can be used for regenerator temperature control.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
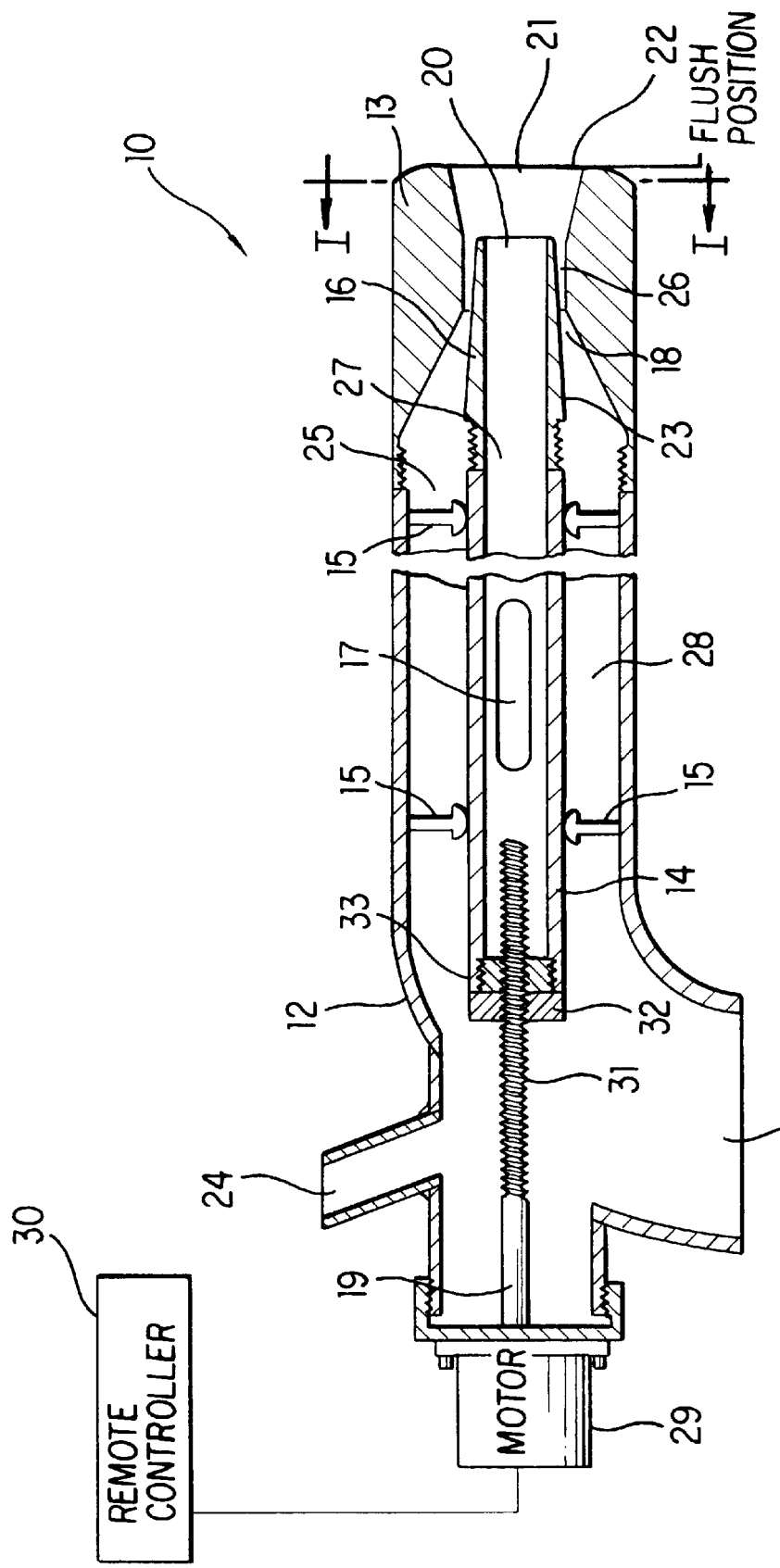
FIG. 1 is a cross-sectional view of a gaseous fuel burner in accordance with one embodiment of this invention.

FIG. 1 shows a gaseous fuel burner in accordance with one embodiment of this invention. Gaseous fuel burner 10 comprises burner body 12 having a fuel inlet 11 and a fuel outlet 25. Burner body nozzle 13 is connected to the fuel outlet end of burner body 12 and comprises constricted throat region 26 and a burner body nozzle fuel outlet end 21. Concentrically disposed within burner body 12 is fuel conduit 14 having a conduit fuel outlet 27 and forming a conduit fuel inlet 17 in a wall of fuel conduit 14. In accordance with one embodiment of this invention, fuel conduit 14 is centered within burner body 12 by means of centering pins 15. Fuel conduit 14 is longitudinally movable within burner body 12 and forms annular region 28 between burner body 12 and fuel conduit 14. Connected to the conduit fuel outlet end of fuel conduit 14 is conduit nozzle 16, the outside surface 23 of which is tapered in the direction of burner body nozzle fuel outlet 21. When fuel conduit 14 is positioned in the extreme forward position, in accordance with one embodiment of this invention, conduit nozzle fuel outlet 20 and burner body nozzle fuel outlet 21 are disposed within the same plane designated by numeral 22. That is, the fuel outlet ends of burner body nozzle 13 and conduit nozzle 26 are flush. The flush position corresponds to the maximum velocity position of fuel conduit 14 for any given fuel flow rate. In addition, although shown as separate elements, it will be apparent to those skilled in the art that burner body nozzle 13 and burner body 12 may be formed as a single element and that fuel conduit 14 and conduit nozzle 26 may also be formed as a single element.

As previously stated, burners utilized in connection with industrial furnaces are located in relatively high temperature, frequently inaccessible places. As a result, manual adjustment of the burners to maintain optimum combustion characteristics at varying fuel inputs is certainly not a desirable task and, in certain cases, may not be possible. In order to address this issue, gaseous fuel burner 10 further comprises conduit means for moving fuel conduit 14 longitudinally within burner body 12. In accordance with one preferred embodiment of this invention, said conduit means comprises a motor-driven shaft 19 connected to fuel conduit 14, which motor-driven shaft 19 is driven by motor 29 operatively connected to motor-driven shaft 19. It will be apparent to those skilled in the art that there are any number of suitable ways for motor-driven shaft 19 to be connected to fuel conduit 14 to enable motor-driven longitudinal movement of fuel conduit 14 within burner body 12. As shown, for example, in FIG. 1, motor-driven shaft 19 comprises a threaded portion 31 which extends through a threaded end piece 32 connected to an upstream end 33 of fuel conduit 14. In accordance with a particularly preferred embodiment of this invention, motor 29 is operatively connected to remote controller 30 disposed at a location remote from gaseous fuel burner 10. Remote controller 30 is used to control motor 29 which, in turn, controls the longitudinal movement of fuel conduit 14 within burner body 12.

Remote controller 30 may be part of a computer control logic scheme for the furnace to which gaseous fuel burner 10 is connected.

The critical element of the gaseous fuel burner of this invention is the longitudinal movement of fuel conduit 14 within burner body 12. To provide maximum fuel velocity for a gaseous fuel exiting gaseous fuel burner 10, fuel conduit 14 is positioned in an extreme forward position such that an upper limit of the fuel entering fuel inlet 11 flows through conduit fuel inlet 17 into the interior of fuel conduit 14 from which it flows through conduit nozzle fuel outlet 20. As fuel conduit 14 is retracted from the maximum velocity position, the annular area 18 between burner body nozzle 13 and conduit nozzle 16 gradually increases. The increase in annular area is due to the tapered design of the outer surface 23 of conduit nozzle 16. As a result of the increase in annular area, a portion of the fuel gas entering burner body 12 through fuel inlet 11 is diverted from flowing through conduit fuel inlet 17 and, instead, flows through annular regions 28 and 18 through burner body nozzle 13. Diverting a portion of the fuel gas in this manner reduces the exit gas velocity of the fuel from burner 10.

Figure 4:
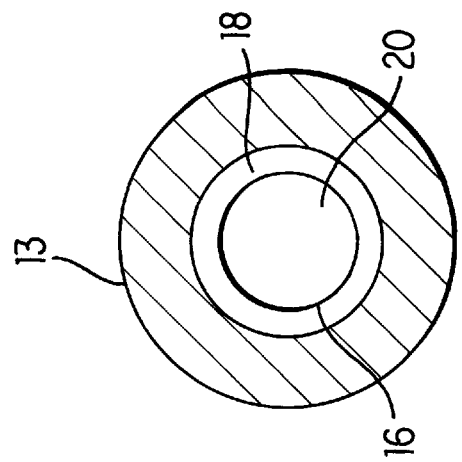
FIG. 4 shows a cross-sectional view along line I—I shown in FIG. 1 of the burner body nozzle of the gaseous fuel burner in accordance with yet another embodiment of this invention.
Figure 3:
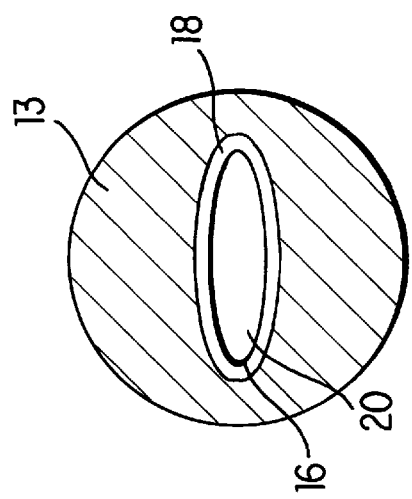
FIG. 3 shows a cross-sectional view along line I—I shown in FIG. 1 of the burner body nozzle of the gaseous fuel burner in accordance with another embodiment of this invention.
Figure 2:
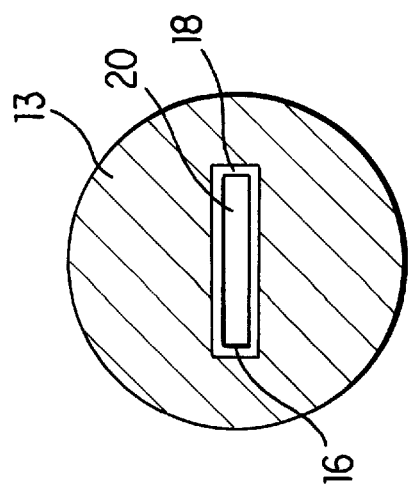
FIG. 2 shows a cross-sectional view along line I—I shown in FIG. 1 of the burner body nozzle of gaseous fuel burner in accordance with one embodiment of this invention.

The cross-section of constricted throat 26 and conduit nozzle 16 can be any shape. Preferably, the cross-section of constricted throat 26 and conduit nozzle 16, as shown in FIGS. 2, 3 and 4, are selected from the group consisting of slotted, elliptical or circular. A circular cross-section as shown in FIG. 4 produces a conventional cylindrical flame having a solid fuel gas core. The elliptical cross-section shown in FIG. 3 and the slotted cross-section shown in FIG. 2 produce broader flat flames.

As previously stated, when gaseous fuel burner 10 is not conveying fuel, purge or cooling air may be supplied to gaseous fuel burner 10 through cooling air inlet 24 when it is not firing. Alternatively, oxidant can be introduced through fuel inlet 11 in which case, a switching valve located near the burner would be used to allow either a gaseous fuel or air to enter the burner body.

Utilizing the gaseous fuel burner of this invention, a method for producing a solid-core gaseous fuel jet in accordance with one embodiment of this invention comprises the steps of introducing a gaseous fuel through a fuel inlet of a burner body of a gaseous fuel burner into an interior of the burner body, introducing at least a portion of the gaseous fuel into a concentrically disposed fuel conduit through an opening in the wall of the fuel conduit, which fuel conduit is longitudinally movable within the burner body and forms an annular region between the burner body and the fuel conduit, and longitudinally adjusting the fuel conduit within the burner body between a first position in which an upper limit of the gaseous fuel flows through the fuel conduit and a second position in which an increased portion of the gaseous fuel flows through the annular region.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A gaseous fuel burner comprising:
   a burner body having a fuel inlet and a fuel outlet;
   a burner body nozzle connected to said fuel outlet and having a constricted throat region and a burner body nozzle fuel outlet;
   a fuel conduit concentrically disposed within said burner body having a conduit fuel outlet and forming a conduit fuel inlet in a wall of said fuel conduit, said fuel conduit longitudinally movable within said burner body and forming an annular region between said burner body and said fuel conduit, and said conduit fuel inlet providing a fluid communication between said annular region and an interior of said fuel conduit whereby fuel can flow from said annular region into said interior of said fuel conduit; and
   a conduit nozzle connected to said conduit fuel outlet of said fuel conduit, an outside surface of said conduit nozzle being tapered in a direction of said burner body nozzle fuel outlet.

2. A gaseous fuel burner in accordance with claim 1 further comprising conduit means for moving said fuel conduit longitudinally within said burner body.

3. A gaseous fuel burner in accordance with claim 2, wherein said conduit means comprises a motor-driven shaft connected to said fuel conduit.

4. A gaseous fuel burner in accordance with claim 1, wherein said burner body forms a cooling air inlet.

5. A gaseous fuel burner in accordance with claim 1, wherein a transverse cross-sectional area of said burner body nozzle and said conduit nozzle is selected from the group consisting of circular, elliptical and slotted.

6. A gaseous fuel burner in accordance with claim 2, wherein said conduit means comprises a controller, said controller controlling said longitudinal movement of said fuel conduit.

7. A gaseous fuel burner comprising:
   a burner body having a fuel outlet, a portion of said burner body immediately upstream of said fuel outlet having a constructed throat region;
   a fuel conduit concentrically disposed and longitudinally movable within said burner body forming an annular region between said burner body and said fuel conduit and having a conduit fuel outlet, an outer surface of said conduit fuel outlet immediately upstream of said conduit fuel outlet being tapered; and
   fuel means for introducing a fuel into said burner body and said fuel conduit whereby fuel can flow from said annular region into an interior of said fuel conduit.

8. A gaseous fuel burner in accordance with claim 7, wherein said burner body forms a cooling air inlet.

9. A gaseous fuel burner in accordance with claim 7 further comprising conduit means for moving said fuel conduit longitudinally within said burner body.

10. A gaseous fuel burner in accordance with claim 9, wherein said conduit means comprises a motor-driven shaft connected to said fuel conduit.

11. A gaseous fuel burner in accordance with claim 7, wherein a transverse cross-sectional area of said burner body nozzle and said conduit nozzle is selected from the group consisting of circular, elliptical and slotted.

12. A gaseous fuel burner in accordance with claim 9, wherein said conduit means comprises a controller, said controller controlling said longitudinal movement of said fuel conduit.

13. A method for producing a solid-core gaseous file jet comprising the steps of:
   introducing a gaseous fuel through a fuel inlet of a burner body of a gaseous fuel burner into an interior of said burner body;
   introducing at least a portion of said gaseous fuel into a fuel conduit through an opening in a wall of said fuel conduit disposed downstream of said fuel inlet of said burner body, said fuel conduit concentrically disposed and longitudinally movable within said burner body, forming an annular region between said burner body and said fuel conduit; and
   longitudinally adjusting said fuel conduit within said burner body between a first position in which most of said gaseous fuel flows through said fuel conduit and a fuel outlet of said burner body and a second position in which an increased portion of said gaseous fuel flows through said annular region and through said fuel outlet of said burner body.

14. A method in accordance with claim 13, wherein said fuel conduit is longitudinally adjusted by remote control means for adjusting said fuel conduit operatively connected to said fuel conduit.

* * * * *